May 30, 1967     F. BUDRECK     3,322,388
HINGED JOINT SUPPORT FOR A REAR VISION MIRROR MOUNTING
Filed Oct. 11, 1965     2 Sheets-Sheet 1
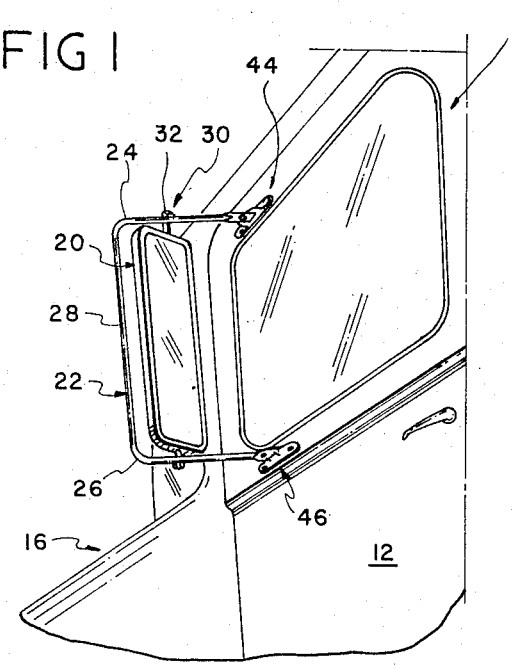
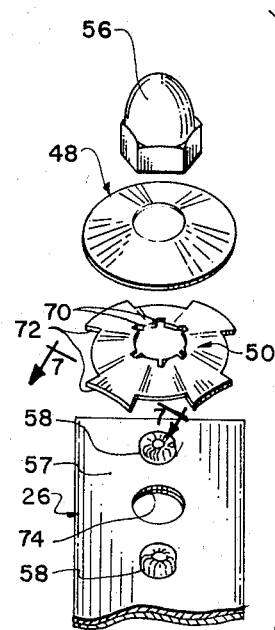
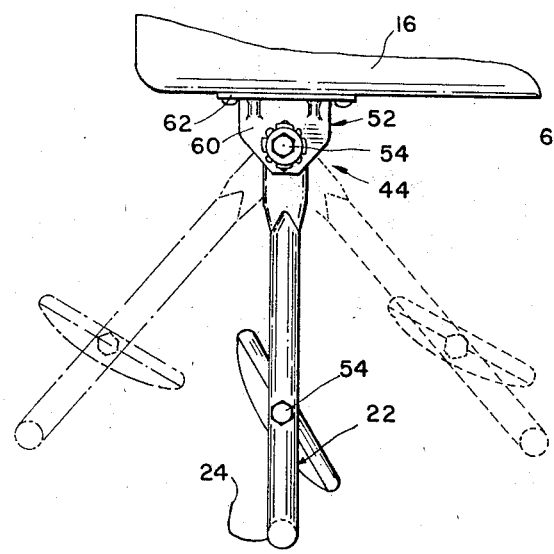
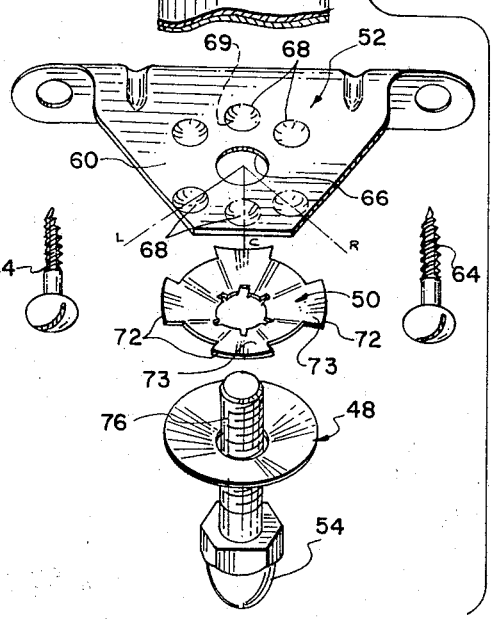
INVENTOR
FRANCES BUDRECK
BY
ATT'Y May 30, 1967 F. BUDRECK 3,322,388
HINGED JOINT SUPPORT FOR A REAR VISION MIRROR MOUNTING
Filed Oct. 11, 1965 2 Sheets-Sheet 2

INVENTOR
FRANCES BUDRECK
BY
ATT'Y

United States Patent Office 3,322,388
Patented May 30, 1967

3,322,388
HINGED JOINT SUPPORT FOR A REAR VISION MIRROR MOUNTING
Frances Budreck, Chicago, Ill., assignor to Monarch Tool & Machinery Co., Chicago, Ill., a corporation of Illinois
Filed Oct. 11, 1965, Ser. No. 494,756
10 Claims. (Cl. 248—289)

The present invention relates generally to automotive rear vision mirror structures and has particular reference to a novel hinged joint support for the mounting of a rear vision mirror of the type which is used in connection with an automotive truck or the motor-driven tractor of a commercial tractor-trailer combination.

The problems which are associated with truck or tractor rear vision mirrors differ appreciably from those that are associated with rear vision mirrors for automotive passenger vehicles by reason of the fact that a rear vision mirror for a truck or tractor extends out or away from the driver's cab an appreciable distance. As a result of this, it frequently is necessary for the driver to pull or swing in the mirror either to clear an object which he is approaching or to enable him to enter a narrow passageway or drive around the corner of a building. Furthermore, a rear vision mirror setting which may be correct for the driver when he is pulling a trailer is usually incorrect when he is "bobtailing" without the trailer. There are thus at least two rear vision mirror settings or adjustments which will effectively accommodate the driver in both instances. Bearing in mind that final mirror settings are usually made by adjusting the mirror frame itself, rough mirror adjustments to accommodate the aforementioned situations are made by adjusting the U-shaped mirror guard frame which invariably supports the mirror frame. Ordinarily, with any given tractor-trailer combination, if two fixed or predetermined accurate guard frame positions which are on the order of thirty degrees apart are provided for, then the mirror frame may be finally adjusted on the guard frame so that selective adjustment of the guard frame between the two positions will suffice for accurate adjustment of the mirror for "bobtailing" and hauling. A fixed position for moving the mirror to a close out-of-the-way position is not necessary nor desirable since the position is only a temporary one and the guard frame need only be pulled inwardly to a position wherein it lies close to the plane of the outer door panel. However, commercial rear vision mirror assemblies are usually so constructed that they may be used either on the cab door adjacent to the driver's seat or on the opposite passenger's door. Therefore, a third fixed position of the guard frame is desirable and is useable only in the latter instance. Thus, if three fixed positions which are spaced approximately thirty degrees apart so as to include a center position and two side positions are provided for the mirror guard frame, then the center position will be useable for either door installation, while one or the other side position will be useable in conjunction with the center position, depending upon which door installation of the assembly is made. In such an instance, the mirror frame itself may be finally adjusted on the guard frame so that only selective adjustment of the guard frame between the three positions will suffice for accurate adjustment of the mirror for "bobtailing," hauling and inoperative out-of-the-way conditions regardless of which door the installation is made. The present invention provides a novel means for attaining such selective mirror frame adjustments.

Many of the hinged joint supports which are now in use in connection with the mountings of rear vision truck or tractor mirrors are subject to binding or locking in the event that the adjacent frame parts become bent or otherwise are out of proper alignment. The present invention affords between a mirror frame and its supporting guard frame a hinged joint support which will tolerate a reasonable amount of misalignment between the frame parts, should such occur, and which, under such circumstances, will nevertheless operate freely without binding and without disturbing the desired mirror settings.

Previously designed hinged joint supports of the type under consideration do not possess sufficient articulated rigidity that both the upper and the lower horizontal guard frame arms will move in unison when effecting an adjustment of the guard frame. If the adjustment is made by pushing on the frame near the lower arm, for example, the necessary degree of torque will not immediately be transmitted to the upper arm and movements of the upper arm will lag the movements of the lower arm so that the normally vertical member of the guard frame will become inclined or canted. The hinged joint support of the present invention overcomes this difficulty and affords an extremely rigid articulation of the mirror frame assembly so that the application of torque to the mirror guard frame at any region therealong will insure uniform bodily shifting of the guard frame to its final adjusted position.

These and other limitations that are present in connection with convention or standard hinged joint supports for the mounting of rear vision truck or tractor mirrors are obviated by the hinged joint support of the present invention.

Generally speaking, the principal object of the present invention is to provide for the mounting of rear vision truck or tractor mirror a hinged joint support which is an improvement on previously designed supports of the same character and is characterized by high efficiency, low cost of manufacture, and ease of operation.

Other objects of the invention and various advantages and characteristics of the present hinged joint support will be apparent from a consideration of the following detailed description or specification.

In the accompanying two sheets of drawings forming a part of this specification, one illustrative form of hinged joint construction has been illustrated.

In these drawings:

FIG. 1 is a fragmentary side perspective view showing the hinged joint support of the present invention operatively applied to a truck-mounted rear vision mirror guard frame;

FIG. 2 is a top plan view of the structure shown in FIG. 1;

FIG. 3 is an enlarged exploded perspective view of the lower joint assembly of the improved hinged joint support;

Figure 5:
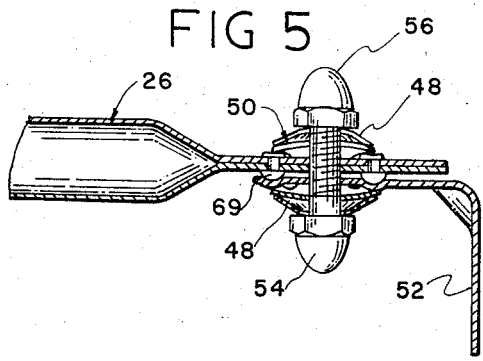
FIG. 5 is a sectional view taken on the line 5—5 of FIG. 4.

Referring now to the drawings in detail and in particular to FIGS. 1 and 2, a rear vision mirror structure is designated in its entirety by the reference numeral 10, and it is shown as being operatively installed upon the driver's entrance door 12 of the cab 14 of an automotive tractor 16. The tractor 16 constitutes the control and motivating section of a tractor-trailer combination, the trailer being omitted from the disclosure although its existence should be borne in mind when considering the various settings of which the rear vision mirror structure 10 is capable. Such structure serves to permit the driver of the tractor 16 to view objects on the highway rearwardly of the tractor either with or without the trailer attached thereto.

The rear vision mirror structure 10 involves in its general organization certain elements which are of well known construction and design and have become standardized in the industry. One such element is the mirror unit 20 and other units (not disclosed herein) are various forms of stand-off bracket parts which serve to maintain the mirror and guard frame assembly widely spaced from the door 12. For convenience of illustration herein, the mirror guard frame 22 is shown as being applied directly to the door 12, but it will be distinctly understood that, if desired, the hinged joint support of the present invention will not appreciably be altered, if at all, when the guard frame is attached to a suitable stand-off bracket assembly.

The mirror unit 20 and its supporting guard frame 22 are both of conventional design except for the provision of certain detent protuberances on the guard frame as will be described in detail hereafter. The guard frame 22 is of C-shape configuration and consists of a bent length of metal tube stock having upper and lower parallel horizontal supporting arms 24 and 26 and an interconnecting vertical bight portion 28. The mirror unit 20 is nested or disposed within the peripheral confines of the guard frame 22 and is pivotally secured at its upper and lower ends to medial points on the guard frame arms 24 and 26 by trunnion supports 30 of conventional construction and including clamping nuts 32 by means of which the angularity of the mirror unit with respect to the guard frame may be adjusted and maintaained. Except insofar as the aforementioned protuberances on the guard frame 22 are concerned, this guard frame and its associated mirror unit and pivotal mountings are purely conventional and no claim is made herein to any novelty associated with the same, the novelty of the present invention residing rather in the construction, combination and arrangement of the parts constituting the hinged joint support by means of which the guard frame 72 is attached either directly to the door 12 of the tractor cab 14 or to a stand-off bracket assembly (not shown) which, in turn, is secured directly to the door.

The hinged joint support of the present invention, in the main, includes upper and lower joint assemblies 44 and 46 of substantially identical construction. Each of such assemblies consists of seven parts (see FIG. 3), namely, two identical dished washers 48, two identical compression rings 50, an attachment bracket 52, a pivot bolt 54 and a clamping nut 56. Such nut, in combination with the pivot bolt, maintains the various component parts of the hinged joint support in their assembled relationship. Strictly speaking, the hinged joint support also includes the limited distal portion 57 of one of the horizontal arms 24 or 26 (as the case may be), such portion carrying the aforementioned protuberances which are identified or designated in the drawings by the reference numeral 58. This limited portion 57 is formed by flattening the end region of the associated tubular horizontal arm, thus providing a dual-thickness laminated end region or detent plate portion.

Figure 6:
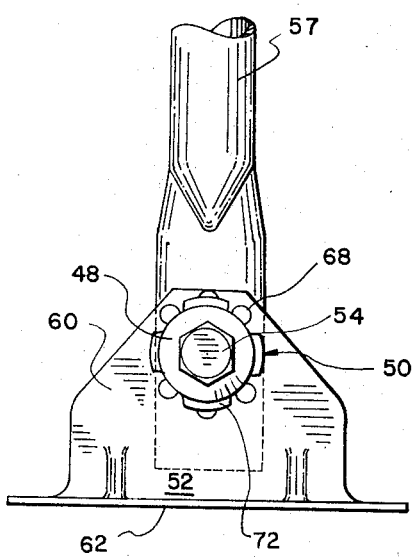
FIG. 6 is a bottom plan view of the lower joint assembly.

Due to the similarity between the upper and lower joint assemblies 44 and 46, a description of one of them will suffice for the other. Accordingly, and as best seen in FIGS. 3 and 6, inclusive, and particularly FIG. 3, the lower joint assembly 46 is illustrated in detail.

The attachment bracket 52 of the lower joint assembly 46 is generally L-shape in cross section and comprises a substantially flat trapezoidal detent plate portion 60 which extends horizontally when the bracket is attached to the cab door 12, and a vertical attachment flange 62 which is formed along the long base of the trapezoidal detent plate portion 60. Holes 63 are provided in the end portions of the flange 62 for reception therethrough of fastening screws 64 by means of which the bracket is secured to the door 12. The horizontal detent plate portion 60 of the bracket 52 is provided with a central hole 66 for reception of the shank portion of the bolt 54. It also is provided with a series of six small shallow frusto-spherical detent recesses 68 for cooperation with the aforementioned protuberances 58. The recesses 68 are pressed in the flat metal stock of the plate portion 60 so that they provide rounded projections 69 on the side of said plate portion that is opposite the recesses 68. The disposition and function of the six recesses 68 will be set forth in detail subsequently.

Figure 7:
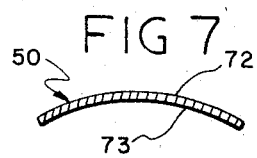
FIG. 7 is an enlarged sectional view taken on the line 7—7 of FIG. 3.

Each of the two compression rings 50 of the lower joint assembly is of shallow dished configuration, there being an upper ring the concavity of which faces downwardly, and a lower ring the concavity of which faces upwardly. Radially extending slots 70 are provided in the inner peripheral portion of each ring, six such slots being shown in the exemplary form of the invention, and these slots lend flexibility to the ring. The outer peripheral portion of each ring 50 is provided with a series of four radially extending ears 72, and these ears are of such arcuate cross section as to provide concavities 73 as shown in FIG. 7, the direction of curvature of the ears being the same as the direction of curvature of the ring as a whole. The rings 50 are formed of spring steel and offer a high resistance to flattening thereof.

Each of the two washers 48 is also of shallow dished circular configuration, there being upper and lower washers the cavities of which face downwardly and upwardly, respectively.

The flattened distal portion 57 of the lower horizontal arm 26 of the guard frame is formed with a hole 74 in the medial region thereof for reception therethrough of the shank portion of the bolt 54. Two short rivets 75 are disposed in diametrically opposed relationship on opposite sides of the hole 74 and the rounded heads of these rivets afford the previously mentioned detent protuberances 58. The two detent protuberances are adapted to cooperate with the six detent recesses 68 in a manner that will be explained presently.

The pivot bolt 54 and its associated clamping nut 56 are of conventional construction. Preferably, both the bolt and the nut are of the cap screw type and the threaded shank portion 76 of the bolt 54 constitutes a hinge pin for the lower joint assembly 46. The shank portion 76 is of sufficient length that it will pass through all of the previously described intermediate elements or parts of the assembly 46 and effectively receive the nut 56 thereon in such a manner as to clamp all of these intermediate parts together.

The lower joint assembly 46 is assembled by threading all of the intermediate parts onto the shank portion 76 of the bolt 54 in the order in which they are illustrated in FIG. 3, after which the nut 56 is applied to the bolt 54 and tightened to its fullest extent. In the completed assembly, the bracket 52 and the flattened portion 57 of the mirror guard frame arm 46 are disposed in contiguity and these two contiguous parts are straddled by two substantially identical cap-head, washer and ring subassemblies above and below the same.

Considering now the lower subassembly 54, 48, 50, it will be observed that the cap-head of the bolt 54 bears upwardly against the washer 48 and the latter, in turn, bears upwardly against the dished compression ring 50, these two parts assuming a nested relationship. In assembling the parts, it is essential for optimum operating conditions that the four radially extending peripheral ears 72 come to rest upon four adjacent protuberances 68 as clearly shown in FIG. 4. The cross sectional curvature of the ears 72 is such that the projections 69 are confined by these ears so that upon angular movement of the guard frame 22 with respect to the fixed bracket 52 and the door 12, the lower compression ring 50 and the subjacent lower dished washer 48 remain fixed with respect to the bracket 52. On the other hand, the equivalent upper subassembly including the upper compression ring 50 and its superposed associated washer 48 will turn with the swinging guard frame arm 26 inasmuch as the radial ears 72 on the compression ring will encounter the projecting flanged or rounded rivet ends which establish the protuberances 58. The nut and bolt assembly 56, 54 is free floating and it may or may not follow the angular movement of the arm 26, depending upon whether or not the frictional forces acting thereon throughout the assembly are greater above or below the arm. In either event, the angular position of the nut with respect to the bolt will not change. In short, upon angular movement of the guard frame arm 26 with respect to the bracket 52, only the upper washer and ring are compelled to turn with the arm. The lower washer and ring remain stationary, and the nut and bolt assembly may or may not turn. This latter assembly consistutes a dual-headed hinge pin for the bracket 52 and the guard frame arm 26.

As best seen in FIG. 3, the six detent recesses 68 in the trapezoidal detent plate portion 60 of the bracket 52 are circumferentially spaced about the central hole 66 and are arranged in two groups of three recesses each on opposite sides of the hole. Diametrically disposed detent recesses are designed for simultaneous cooperation with the detent protuberances 58 so as to afford three predetermined fixed positions of the guard frame 22. These three positions include a central or outer extended position such as is shown in full lines in FIG. 2 and involving the detent recesses 68 labelled C; an operative rear inner retracted position such as is shown in dotted lines and involving the detent recesses labelled R; and an inoperative forward inner retracted position shown in dotted lines and involving the detent recesses labelled F.

Where the rear vision mirror structure is installed upon the driver's entrance door 12 at the left-hand side of the cab 14 of the tractor 16, only the full and dotted line positions of the guard frame 22 are operative or effective positions, the former position being used when the tractor is hauling a trailer and the latter position being used when the tractor is "bobtailing." The third or forward position shown in broken lines ordinarily is not used in such an instance, but when the mirror structure is installed upon the passenger's door at the right-hand side of the cab of the tractor, this position then automatically becomes an effective rear retracted position and the dotted line position of the guard frame becomes the inoperative forward retracted position of the guard frame.

The radial distance between the center of the hole 66 and the various recesses 68 is precisely equal to the radial distance between the center of the hole 74 and the protuberances 58 so that these protuberances will register selectively with any pair of two diametrically disposed recesses 68. The guard frame 22, in swinging between any two of the operative positions of which it is capable of assuming, will cause the already slightly spaced planar portions of the bracket 52 and the arm 26 to increase their spacing, while the protuberances 58 ride out of their associated recesses 68 and then resume their normal spacing as these protuberances snap into the next adjacent pair of diametrically opposed detent recesses. During the time that the protuberances 58 are between recesses 68, the two dished compression rings 50 will become partially flattened, thus applying tension to the shank portion 76 of the bolt 54 through the media of the nut 56 in the case of the upper ring and the bolt head in the case of the lower ring.

Figure 4:
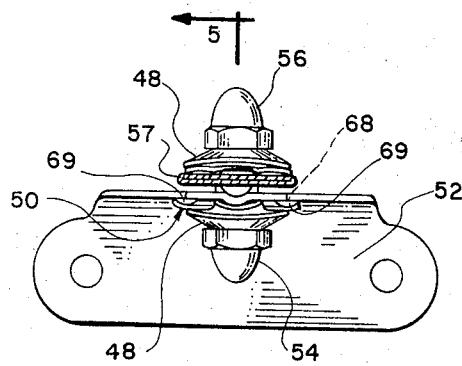
FIG. 4 is a vertical sectional view taken on the vertical plane indicated by the line 4—4 of FIG. 2.
Figure 8:
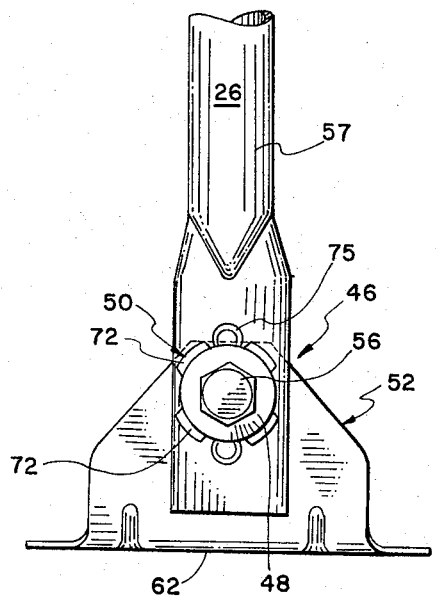
FIG. 8 is a top plan view of the lower joint assembly.

It is finally to be noted that while the nut and bolt assembly 56, 54 of either the upper joint assembly 44 or the lower joint assembly 46 is reversible in end-to-end fashion, the various parts preferably are assembled so that the nuts 56 lie within the confines of the guard frame 22. Thus, as shown in FIG. 4, the shank portion 76 of the bolt projects vertically upwardly in the case of the lower assembly 46, while the bolt shank of the upper assembly 44 projects vertically downwardly.

The invention is not to be limited to the exact arrangement of parts shown in the accompanying drawings or described in this specfication as various changes in the details of construction may be resorted to without departing from the spirit or scope of the invention. Therefore, only insofar as the invention has particularly been pointed out in the accompanying claims is the same to be limited.

Having thus described the invention, what I claim as new and desire to secure by Letters Patent is:

1. A hinged joint support for relatively turnable supporting and supported members as for a rear vision mirror mounting on a vehicle, in combination, a supporting member, a bracket fixedly secured to the supporting member and having a first flat detent plate portion provided with a hole therein, a supported member having a second flat detent plate portion likewise provided with a hole therein, said plate portions being in substantial contiguity and the holes therein in axial register, a hinge pin projecting through said holes and constituting a main hinge joint between the plate portions, one of said detent plate portions being provided with a circular row of spaced detent recesses concentric with the hole therein, said recesses being pressed in the material of the associated plate portion so as to provide corresponding projections on the side of the plate portion remote from the recesses, said recesses, and consequently, the projections, being disposed in diametrically opposed pairs, the other detent plate portion being provided with a pair of diametrically disposed detent protuberances on opposite sides of the hole therein and designed for selective register and cooperation with the pairs of detent recesses of said one detent plate portion upon relative turning movement between the supporting and supported members, means establishing an enlarged head at each end of the hinge pin, a first flexible dished compression ring formed of spring material, surrounding the hinge pin and interposed between one of said heads and said one plate portion, having its apex region effectively bearing against said latter head, and having its rim region bearing against said one plate portion, and a second and similar dished compression ring surrounding the hinge pin, interposed between the other head and the other plate portion, having its apex region effectively bearing against said latter head, and having its rim region bearing against said other plate portion, said compression rings being under axial compression with the hinge pin being floatingly biased thereby in opposite axial directions.

2. A hinged joint support as set forth in claim 1 and wherein the rim region of said first dished compression ring bears directly upon the projections provided on said one detent plate portion.

3. A hinged joint support as set forth in claim 1 and wherein the rim region of said first dished compression ring is formed with a series of concavities therein, said concavities receiving therein certain of the projections provided on said one detent plate portion and constraining the first compression ring against turning movement with respect to said one detent plate portion.

4. A hinged joint support as set forth in claim 1 and wherein the rim region of said first dished compression ring is formed with a series of radially outwardly extending ears which are of arcuate cross section in a circumferential direction and provide respective concavities within which certain of the projections provided on said one detent plate portion are received to constrain the first compression ring against turning movement with respect to said one detent plate portion.

5. A hinged joint support as set forth in claim 4 and including, additionally, a dished washer interposed between each compression ring and the adjacent hinge pin head and within which the apex region of the compression ring is nested, said washer constituting the means whereby the compression ring effectively bears against the associated head.

6. A hinged joint support as set forth in claim 5, wherein the over-all diameter of each washer is less than the diameter of its associated compression ring and wherein the ears on said compression ring lie outside the peripheral confines of the washer.

7. A hinged joint support as set forth in claim 5 and wherein the apex region of each dished compression ring is formed with a series of radial slots which lend additional flexibility to the ring.

8. A hinged joint support for relatively turnable supporting and supported members as for a rear vision mirror mounting on a vehicle, in combination, a supporting member, a bracket fixedly secured to the supporting member and having a first flat detent plate portion provided with a hole therein, a supported member having a second flat detent plate portion likewise provided with a hole therein, said plate portions being in substantial contiguity and the holes therein in axial register, a hinge pin projecting through said holes and constituting a main hinge joint between the plate portions, one of said detent plate portions being provided with a circular row comprising six spaced detent recesses concentric with the hole therein, said recesses being pressed in the material of the associated plate portion so as to provide corresponding projections on the side of the plate portion remote from the recesses, said recesses, and consequently the projections being disposed in diametrically opposed pairs and in two groups of three recesses each on opposite sides of the hole, the other detent plate portion being provided with a pair of diametrically disposed rivets on opposite sides of the hole therein, said rivets passing through the plate portion and on the side thereof opposing said one detent plate portion presenting rounded rivet heads establishing detent protuberances designed for selective register and cooperation with the pairs of detent recesses of said one detent plate portion upon relative turning movement between the supporting and supported members said rivets, on the side of the associated plate portion remote from said one detent plate portion presenting flanged rivet ends which project out of the plane of said latter detent plate portion, means establishing an enlarged head at each end of the hinge pin, a first flexible dished compression ring formed of spring material surrounding the hinge pin and interposed between one of said heads and said one plate portion, having its apex region effectively bearing against said latter head, and having a series of four radially and outwardly extending equally and circumferentially spaced ears provided on its rim region, each ear being formed with a concavity within which a projection on said one detent plate portion seats and constrains relative turning movement between said first compression ring and said one detent plate portion, and a second and identical dished compression ring surrounding the hinge pin and interposed between the other head and the other detent plate portion, having its apex region effectively bearing against said latter head, and having the ears thereof seated directly on said other detent plate portion and in between adjacent flanged rivet ends whereby relative turning movement between said second compression ring and said other detent plate portion is prevented, said compression rings being under axial compression with the hinge pin being floatingly biased thereby in opposite axial directions.

9. A hinged joint support as set forth in claim 8 and including, additionally, a dished washer interposed between each compression ring and the adjacent hinge pin head and within which the apex region of the compression ring is nested, said washer constituting the means whereby the compression ring effectively bears against the head.

10. A hinged joint support as set forth in claim 9 and wherein the apex region of each dished compression ring is formed with a series of radial slots which lend additional flexibility to the ring.

References Cited
UNITED STATES PATENTS

| | | | |
|---|---|---|---|
| 1,226,173 | 5/1917 | Benjamin | 287—101 X |
| 3,119,591 | 1/1964 | Malecki | 248—282 |
| 3,189,309 | 6/1965 | Hager | 248—486 X |

ROY D. FRAZIER, *Primary Examiner.*

F. DOMOTOR, *Assistant Examiner.*